March 31, 1970  J. TOULEMONDE  3,504,265
DEVICE FOR CONVERSION OF ELECTRICAL ENERGY
FROM AC TO DC AND VICE VERSA
Filed Nov. 21, 1967  7 Sheets-Sheet 1

INVENTOR:
JACQUES TOULEMONDE

BY: Craig & Antonelli
ATTORNEYS

March 31, 1970 J. TOULEMONDE 3,504,265
DEVICE FOR CONVERSION OF ELECTRICAL ENERGY
FROM AC TO DC AND VICE VERSA
Filed Nov. 21, 1967 7 Sheets-Sheet 2

INVENTOR:
JACQUES TOULEMONDE

BY: Craig e Antonelli
ATTORNEYS

FIG. 6c
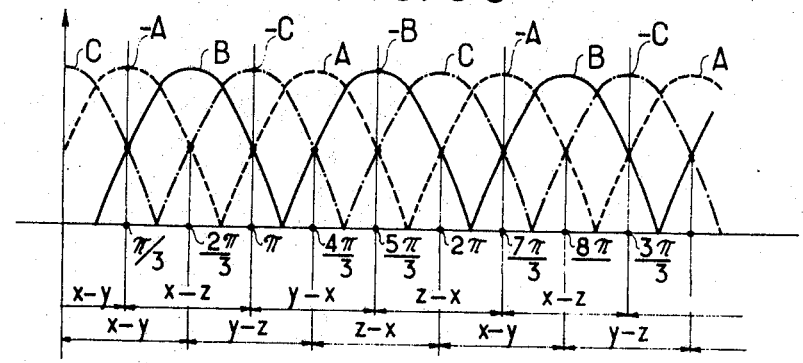
FIG. 7
|  |  | PA | PR | Th | |
|---|---|---|---|---|---|
| 0 | I | Z | Y | $T_5$ | $T_4$ |
| $\frac{\pi}{3}$ | II | X | Y | $T_1$ | $T_4$ |
|  | I | X | Y | $T_1$ | $T_4$ |
| $\frac{2\pi}{3}$ | II | X | Z | $T_1$ | $T_6$ |
|  | I | X | Z | $T_1$ | $T_6$ |
| $\pi$ | II | Y | Z | $T_3$ | $T_6$ |
|  | I | Y | Z | $T_3$ | $T_6$ |
| $\frac{4\pi}{3}$ | II | Y | X | $T_3$ | $T_2$ |
|  | I | Y | X | $T_3$ | $T_2$ |
| $\frac{5\pi}{3}$ | II | Z | X | $T_5$ | $T_2$ |
|  | I | Z | X | $T_5$ | $T_2$ |
| $2\pi$ | II | Z | Y | $T_5$ | $T_4$ |
FIG. 9
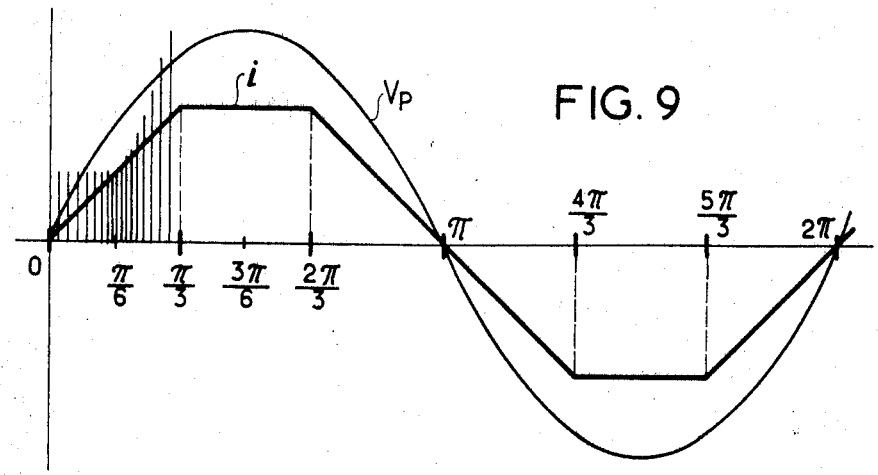

United States Patent Office 3,504,265
Patented Mar. 31, 1970

3,504,265
DEVICE FOR CONVERSION OF ELECTRICAL ENERGY FROM AC TO DC AND VICE VERSA
Jacques Toulemonde, Versailles, France, assignor to Compagnie Generale d'Electricite, Paris, France, a French corporation
Filed Nov. 21, 1967, Ser. No. 684,808
Claims priority, application France, Nov. 21, 1966, 84,374
Int. Cl. H02m 7/04
U.S. Cl. 321—5      12 Claims

ABSTRACT OF THE DISCLOSURE

Converter device for converting electrical energy from A.C. to D.C. or conversely, with a cos $\varphi$ nearly equal to one, comprising solid state controlled rectifiers energized by triggering pulses, wherein said pulses are delayed from the appearance of an alternating tension in the conducting direction by a period which is automatically adjusted according to a given value, by means of a program device.

---

The invention concerns devices for transforming alternating into direct electrical energy and vice versa, with a cosine $\varphi$ substantially equal to unity, by releasing current oscillations whose sum is equivalent, during one alternation of the voltage, to an alternating current flux in phase with this alternation.

Our copending U.S. patent application Ser. No. 626,792, filed Mar. 29, 1967, discloses a device in which during one alternation of the voltage, trains of semi-sinusoidal waves of current at high frequency are released, of the same polarity as the said alternation of voltage (for functioning as rectifier), or of reverse polarity (for functioning as an inverter), the said trains having variable duration in correlation with the difference between the value of the mean current resulting from the integration of a train and an order value given by a programming member.

In accordance with the present invention a device for A.C./D.C. or D.C./A.C. electrical energy with cosine $\varphi$ approximating to unity and with solid state rectifiers of the thyristor type or similar, has means for releasing individual current pulses at a frequency very much higher than the A.C. frequency, with delay between two successive pulses adjusted by a programming member as a function of an order value of the current.

In accordance with another characteristic, the device has means for controlling the starting of at least one thyristor of the voltimetric type in functional relation with a variable delay member which can trigger the thyristor or thyristors at the end of a predetermined delay period after there has appeared on the said thyristor or thyristors a voltage in the conductive direction.

The above mentioned triphased programming member has means for sorting release orders into two series (even and odd) bringing about the alternated supply of two of the three phases and the non alternated supply of the third, having as result current alternations of trapezoidal shape, i.e., with low harmonic strength.

A simple alternation circuit of monophased conversion has at the terminals of a source, in series, a first inductor, a thyristor, a capacitor, which supplies a second inductor in series with a D.C. consumer, the gate of the said transistor receiving release pulses at intervals which are approximately regular, from a programming member.

A starred monophased conversion circuit has two thyristors connected respectively to the terminals of the secondary winding of a symmetrising transformer, whose primary winding is connected to a monophased source, these two thyristors each having an electrode of the same polarity connected to a terminal of a capacitor which is in series with a first inductor connected to the central point of the said secondary winding, the said capacitor supplying current in a series circuit comprising at least one second inductor and a D.C. load, the gates of the said thyristors being connected to two outputs of a programming member.

A thriphased conversion circuit has a transformer whose secondary winding is connected in star formation, three inductors in series with the three secondary windings respectively, six thyristors in Graetz assembly with three arms, the central point of two of which is connected to the end of one of the said inductors, three first ends of the three arms being connected in parallel to a terminal of a capacitor, three second ends being connected in parallel to the other terminal of the said capacitor, which capacitor can supply direct current through a high value inductor to a load, the gates of the said thyristors being connected to a programming member which receives instructions on the instantaneous voltage values of the three phases as well as an external control.

The invention will now be describd in detail with reference to the accompanying drawing, in which:

FIGURE 1 is a diagram showing application to a simple alternation monophased source.

FIGURES 2a, b, c, d are curves explaining the functioning of the devices in accordance with the invention.

FIGURES 6a, 6b, 6c are curves showing the basis of functioning of the device in accordance with FIGURE 5.

FIGURE 7 is a table making it easier to understand the triphased functioning in the course of a complete period of the alternating voltage.

FIGURE 9 shows the shape of the current obtained in the case of a triphased sector.

Figure 1:
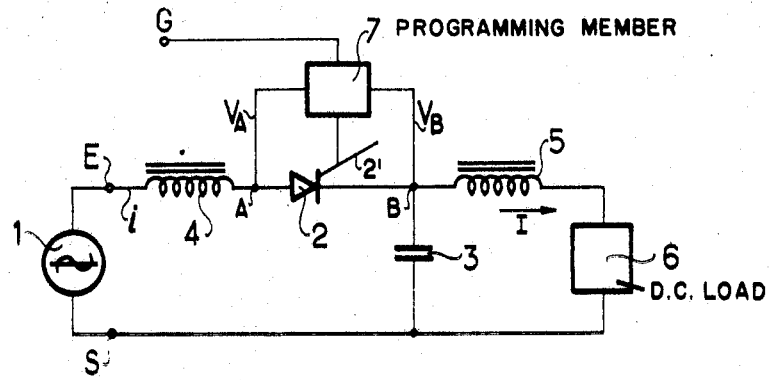

In FIGURE 1, 1 is a monophased source with terminals E and S, 4 is a comparatively low value inductor connected to E, 2 is a thyristor with terminals A and B connected by its terminal A to the inductor 4, 3 is a capacitor connected between the terminal B of the said thyristor 2 and the terminal S of the source 1. This capacitor 3 can supply current to a series circuit comprising an inductor 5 of comparatively high value and a D.C. load 6, for instance a transport line with direct voltage. The gate 2' of the thyristor 2 is controlled by a programming member 7 which can be connected to the points E, S, A, B, and receives an order through a terminal G.

For a voltage $V_A - V_B$, assumed to be positive, with the thyristor 2 blocked, a release order applied at 2' brings about a starting of the thyristor. As its impedance becomes very low, the voltage at its terminals $V_A - V_B$ becomes quasi-null. A wave of current of oscillatory form sets up in the circuit connected in series formed by the inductor 4, the thyristor 2 which has been started, and the capacitor 3, the frequency of the oscillating system being determined by the values of the inductor 4 (L)

and of the capacitor 3 (C). A semisinusoidal wave of current is established, passes through a maximum and returns to zero. At this moment by the natural functioning of a thyristor, the thyristor 2 becomes blocked and its impedance again becomes very high.

These phenomena are illustrated in FIGURE 2 which shows the oscillogram reproductions picked up from an installation in operation. The curve (*a*) of FIGURE 2 shows the variations of the voltage $V_T = V_A - V_B$ across the terminals of the thyristor 2. The curve (*b*) of FIGURE 2 shows the variations of the current *i* in the thyristor 2.

At the point marked *p*, the voltage $V_T$ at the terminals of the thyristor 2, which is blocked, is in the forward sense (polarity +). An unblocking pulse applied to the gate 2′ by the programming member 7 (FIGURE 1) makes the thyristor conductive. The current sets up in oscillating form (point *v* of the curve (*b*)), passes through a maximum and repasses again through zero (*w*). At the same time the voltage $V_T$ is quasi-null (segment *qr* of the curve (*a*)).

When the current in the thyristor 2 reaches zero the thyristor becomes blocked and the current *i* remains zero during a finite period. This is the zero level *wv′* of the curve (*b*).

The circuit is interrupted at the moment of zero current. The cutting off of current is accordingly not accompanied by a rapid variation in the current but the slope of the current, *di/dt*, which was strongly negative, suddenly becomes zero. The result of this is an induction effect which causes $V_T$ to pass suddenly from 0 to $V_c$, the voltage at the terminals of the capacitor 3.

FIGURE 2(*c*) shows variations of the voltage $V_c$ at the terminals of the capacitor 3 during an alternation. This potential fluctuates about the pase voltage $V_p$. During the time when the thyristor is supplying current (segment *gh*), the capacitor is charging, the voltage $V_c$ increases and exceeds the voltage $V_p$. When the thyristor is blocked, the portion *hk*, the capacitor discharges at the rate *I/C*, *I* being the permanent D.C. supply into the load 6. The potential again passes below $V_p$, then it rises again from *k* to *l*, and so on.

From the mode of operation functioning law of the series resonant LC circuit formed by the inductor 4 and the capacitor 3, the variations of the voltage $V_c$ on both sides of the phase voltage $V_p$ are equal. At the same time the current pulses (FIGURE 2*b*) are equal to each other.

With the capacitor 3 discharging into the load 6 through the high value smoothing inductor 5, supplying a current $I_v$ which is approximately constant, the potential B of the point B is reduced according to $$\frac{dV_B}{dt} = \frac{I}{C}$$

In other words, the difference of potential V at the terminals of the thyristor, at first negative (nonconductive direction) increases and passes through zero (point *u* of the curve (*a*)). However, the thyristor 2 is not restarted at the point *u*: it is restarted a time T later, at the moment when the voltage V has increased up to the point *p*. The value T of the delay period in the starting is regulated by the programming member 7 as a function of the parameters of the installation and of the order value given by the program G.

The current pulses are emitted during one alternation in two. During the other alternations of inverse polarity the thyristor remains blocked and the current does not pass.

Figure 2A:
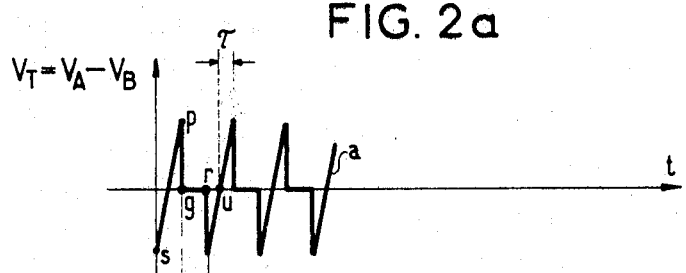
Figure 2B:
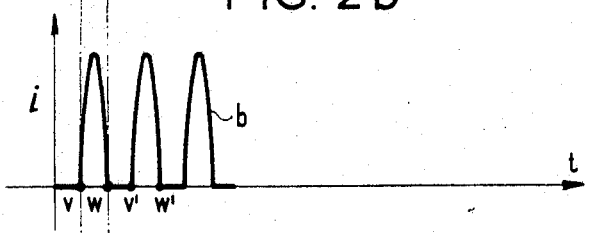
Figure 2C:
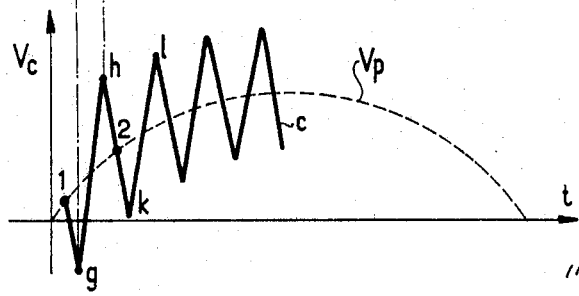
Figure 2D:
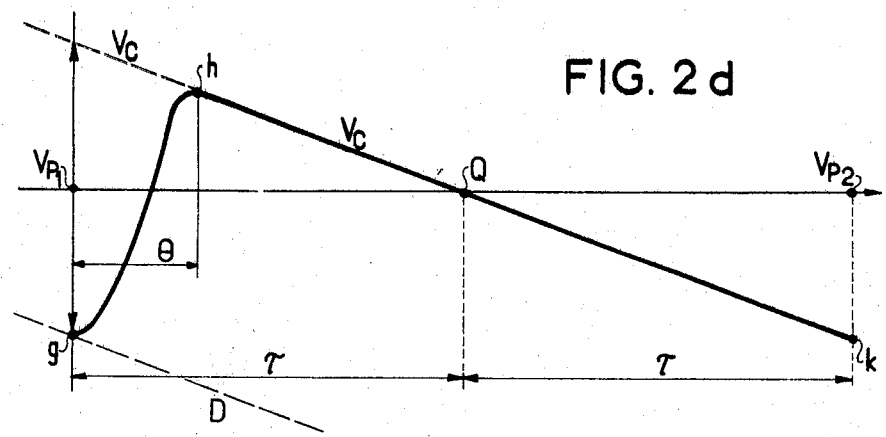

FIGURE 2*d* is a view on a larger scale of a portion of FIGURE 2*c*, giving a closer analysis of the process of charging and discharging of the capacitor 3.

It is supposed that between two successive instants of triggering of the current, the voltage of the phase $V_p$ has not substantially varied: $V_{p2} = V_{p1} + \epsilon$, $\epsilon$ being a negligible amount. This hypothesis will simplify the drawing of the figure, while giving a sufficiently exact idea of the phenomena.

At the moment when the thyristor is triggered, the voltage $V_C$ at the terminals of the capacitor 3 is at the point *g*. The capacitor supplies current I to the load the potential of the capacitor all the time drops as a function of time in accordance with a straight line parallel to the straight line D of FIGURE 2*d*. A current impulse of duration should cause the potential to rise from *g* to *h*. From *h* the potential $V_C$ follows a straight line *hk*, the value of the potential $V_C$ at the end of the delay period T on the restarting of the thyristor after the passage at point Q or $V_p$. It can be seen that the point Q cuts the segment $V_{p1}$ to $V_{p2}$ into two equal parts, and consequently the time which passes between one starting of the thyratron and the passage of the curve $V_C$ through the value of $V_p$ is approximately equal to the delay time T.

The immediate result is that the time T should be at least equal to the duration $\theta$ of one current oscillation, plus $t_Q$ the time for de-energizing the thyristor; if not, as soon as $V_C$ passes below $V_p$ beyond the point Q, the thyristor would restart.

The functioning has been described in elementary form of a simple alternation monophased installation.

Figure 3:
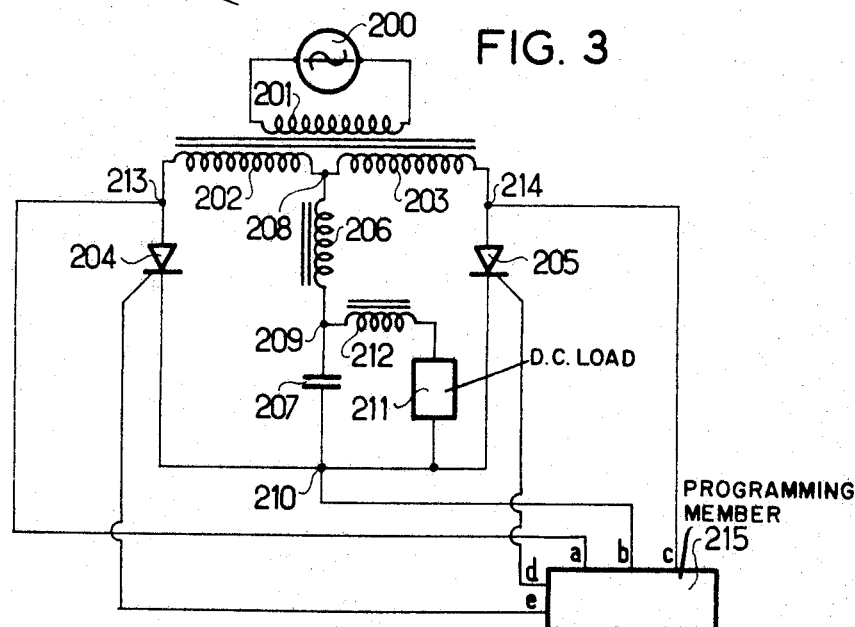
FIGURE 3 is a diagram showing application to a monophased source.

In actual fact a monophased installation will be mounted preferably in start formation in accordance with the diagram of FIGURE 3, which has a monophased source 200 supplying a transformer with a primary winding 201, whose secondary winding is formed of two symmetrical halves 202 and 203, with a central point 208. The inductor 206 is connected on one side to the point 208 and on the other to the point 209 connected to a capacitor 207 which can supply current to a circuit in series formed of a smoothing inductor 212 and a direct current load 211, this series circuit being connected to the points 209 and 210. A thyristor 204 is connected between the end 213 of the half secondary winding 202 and the point 210; another thyristor 205 is connected between the end 214 of the half secondary winding 203 and the point 210. The gates of these thyristors are connected to a programming member 215 (terminals *d* and *e*), which is connected to points 213, 210, 214 through the terminals *a*, *b*, *c*, respectively, and can receive an order through the connection P.

The functioning principle is the same as above: the inductor 206 and the capacitor 207 form a resonant series circuit which supplies isolated pulses of current of demi-sinusoidal shape each time one of the thyristors is started by a control signal received through its gate, until the passage of the said current through zero.

During one alternation of the alternating voltage, one of the thyristors will be unblocked several times in accordance with the above process, the other, which is supplied in the non-conductive direction, remains blocked: for instance, during one alternation of the alternating voltage which makes the point 213 positive in relation to the point 208, the supply will pass through the thyristor 204. During the succeeding alternation, which makes the potential of the point 214 positive in relation to the point 208, it is the thyristor 205 which supplies current intermittently the thyristor 204 remaining blocked.

Contrary to the case of FIGURE 1, the current flows during the whole of the period of the supply voltage.

Figure 4:
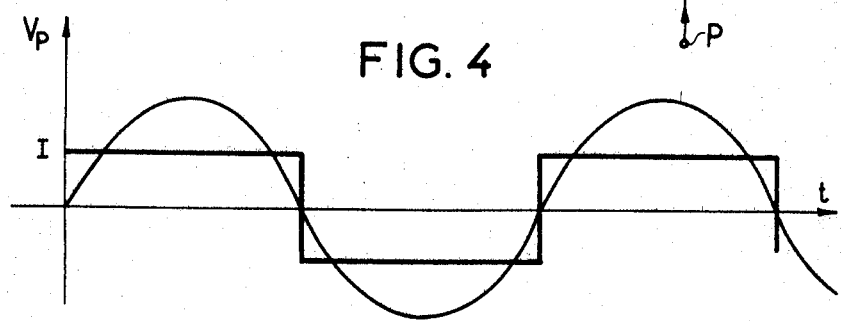
FIGURE 4 shows a graph of current in phase with the voltage obtained in accordance with the diagram of FIGURE 3.

As the supply of each individual current pulse is constant, as in the above case, the complete period of the alternating sector supplies a mean current which has the form of two levels as is shown in FIGURE 4, the intensity of the current supplied by each alternation being equal to the direct current supplied to the load. These levels are in phase with the monophased voltage $V_p$ which is the condition of supply of non reactive sector.

To increase the current supplied, the delay is decreased between the passage of the voltage $V_T$ through zero (point *u* FIGURE 2*a*) and the point of starting of a thyristor (point *p*). The release of current in individual pulses takes place at a more rapid rate. The amplitude of the pulse does not vary very much: the current supplied accordingly increases. In the same way one decreases the current supplied by extending the delay time $t$.

The invention accordingly provides a good means for regulating rectifier current with cosine $\phi=1$.

There will now be described a particular modification in the application of the invention to the case of a polyphased sector, particularly interesting by reason of the fact that, as will be shown below, by virtue of certain inter relations between the phases, one obtains in each phase a supply that is approximately trapezoidal.

This represents a considerable advantage from the industrial viewpoint. In actual fact, supply in the form of rectangular waves of the type shown in FIGURE 4 supplies very high harmonic strength; in the case of triphased Graetz bridge assembly, there is 20% of harmonic 5, 14% of harmonic 7 and so on, with a diminution in $1/n$, $n$ being the range of the harmonic. On the other hand, under the same conditions, with a supply in trapezoidal waves, the harmonic 5 is 4% only and the harmonic 7.2%, with a diminution in $1/n^2$.

The harmonics of the current supplied to the distribution sector by coupling through the supply transformer, cause disturbance in the said distribution; rigorous conditions are imposed in this connection by specification on distributing companies. As a result there is the obligation to filter upstream of the primary winding of the supply transformer, to avoid the propagation of these harmonics in the distribution network. For the great power in question, the necessary filtering installations are extremely costly and represent a considerable proportion of the price of a rectifying installation. One can accordingly see what interest there is in an equally considerable diminution in the harmonics ratio; the filtering members are considerably relieved, bringing considerable economy, and this relief can amount to for instance 20%.

The application of the invention to a polyphased sector with arrangements making it possible to obtain in each phase a trapezoidal current, as will be set out below, is accordingly of first-rate practical importance.

This application will now be described in relation to the case, taken as example, of a triphased network.

Figure 5:
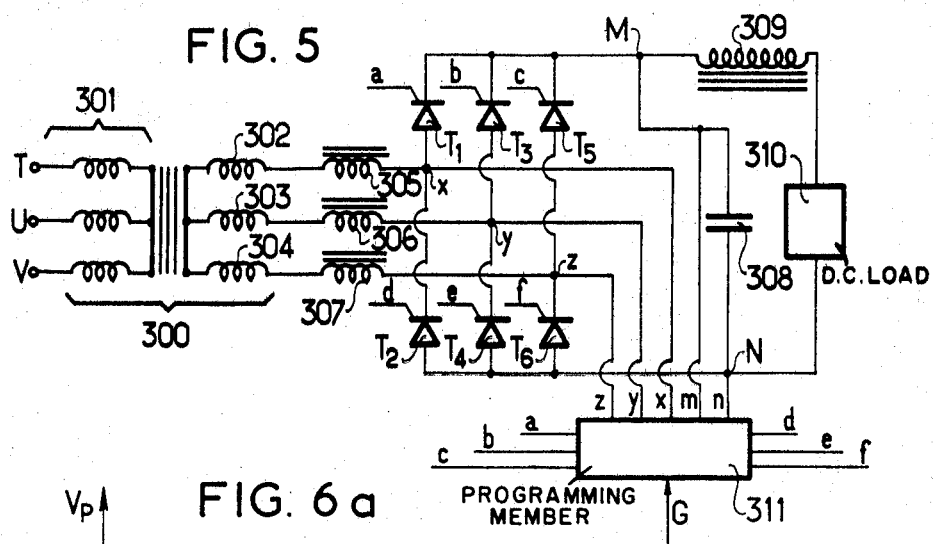
FIGURE 5 is a diagram of application to a triphased source.

In FIGURE 5, the primary winding 301 of a triphased transformer 300 is supplied at T, U, V, by the three phases of a triphased network. The secondary winding has three windings 302 (phase X), 303 (phase Y), 304 (phase Z), connected for instance in star formation, each in series with an inductor 305, 306, 307, respectively. A grouping of 6 thyristors with Graetz bridge, $T_1$, $T_2$, $T_3$, $T_4$, $T_5$, $T_6$, with three arms, with $T_1$ and $T_2$ in series, $T_3$ and $T_4$ in series, $T_5$ and $T_6$ in series, is supplied at the central point $x$ of the first arm by the phase X through the inductor 305 and similarly for the central point $y$ of the second arm for the phase Y and the central point $z$ of the third arm for the phase Z. The three cathodes of the thyristors $T_1$, $T_3$, $T_5$ called "go" thyristors, are connected in common to one terminal of a capacitor 308, the three anodes of the thyristors $T_2$, $T_4$, $T_6$ called "return" thyristors in common to the other terminal of the capacitor 308. The capacitor 308 with terminals M and N can supply D.C. to a load 310 (for instance a distribution line), through a high value inductor 309 serving for the smoothing of the current supplied.

The output points of the phases $x$, $y$, $z$, the terminals M and N of the capacitor and the gates $a$, $b$, $c$, $d$, $e$, $f$, of the six thyristors are connected to a programming member 311, containing inter alia a comparator which receives an order G, for instance the value of the current to be supplied to the load 310.

As in the monophased case, there is the possibility of releasing individual pulses of current of demisinusoidal shape. These pulses are a phenomenon of resonance in series with two of the inductors 305, 306, 307, in series with the capacitor 308, which can develop between two of the points $x$, $y$, $z$, when two thyristors, one thyristor of the "go" type and one thyristor of the "return" type, are started at the same time.

It is no longer a single phase which is the origin of the supply of energy as in the monophased case described above, but the association of two phases, one supplying a current called "go" through starting a "go" thyristor (uneven number), the other supplying a "return" current through starting a "return" thyristor (even number).

The reference potential is accordingly not the potential of each phase but the differences of potential between phases.

Figure 6A:
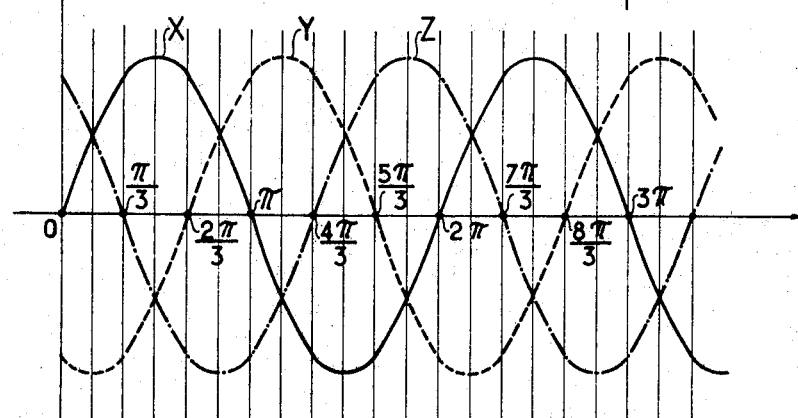
Figure 6B:
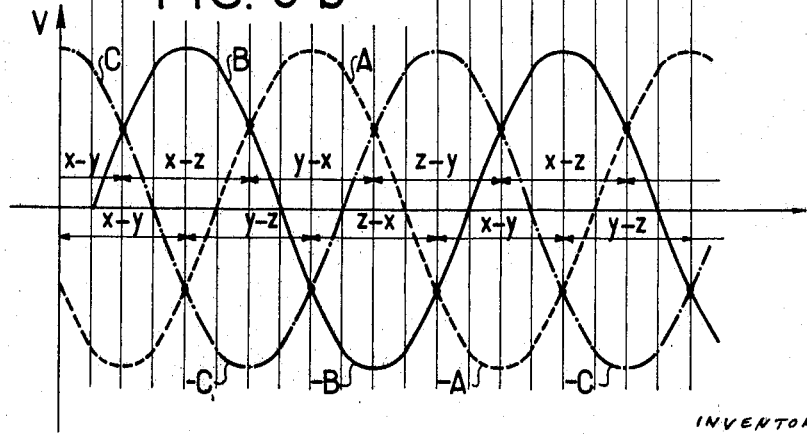

For this reason there has been shown FIGURE 6a the potentials of the three phases X, Y, Z in relation to neutral, illustrated for simplification by the same symbols X, Y, Z, and in FIGURE 6b the voltages between phases referenced with A, B, C and —A, —B, —C.

A study of FIGURE 6b shows the following: if one examines the lower portion of FIGURE 6b, i.e., the part located below the axis of the abscissae, between 0 and $2\pi/3$ the graph —A has the greatest amplitude and the corresponding interval is referenced by X–Y, which indicates that the potential of the point $x$ is greater than that of $y$, the interval $2\pi/3$ to $4\pi/3$ is referenced with Y–Z and the interval $4\pi/3$ to $2\pi$ is referenced by Z–X.

Let us consider that the interval $4\pi/3$ to $2\pi$ referenced with Z–X, which indicates that the potential of the point $z$ is greater than that of the point $x$ (FIGURE 5) and that the thyristors $T_5$ and $T_2$ of FIGURE 5 can be started; in the interval $4\pi/3$ to $5\pi/3$ in the upper portion FIGURE 6b, one can see that one has Y–X, i.e., the potential of $y$ is greater than that of $x$ and consequently that one can release the thyristors $T_3$ and $T_2$; finally, in the interval $5\pi/3$ to $2\pi$, and in the upper portion FIGURE 6b, one can see that one has Z–Y, i.e., that the potential of $z$ is greater than that of $y$ and consequently that one can release the thyristors $T_5$ and $T_4$; it should of course be clear that the releasing of the thyristors cannot take place if the voltage between phases under consideration is less than the voltage at the terminals M and N of the capacitors 308 of FIGURE 5.

Accordingly, in the interval $4\pi/3$ to $2\pi$ one can obtain for instance the following functioning: between $4\pi/3$ and $5\pi/3$ the thyristors $T_3$ and $T_5$ will be started alternately for the duration of one oscillation, the return being carried out each time through the thyristor $T_2$, i.e., $T_3$ by the pulses of odd range and $T_5$ by the pulses of even range, $T_2$ for the two series of pulses; between $5\pi/3$ and $2\pi$ the thyristor $T_5$ will be started a certain number of times, the return being carried out alternately through $T_2$ and $T_4$. By considering the intervals 0 to $2\pi/3$, $2\pi/3$ to $4\pi/3$, $4\pi/3$ to $2\pi$ and by applying the reasoning given above for the interval $4\pi/3$ to $2\pi$, one will obtain the complete functioning for one cycle, this functioning being identical for the following cycles 2 to $4\pi$, $4\pi$ to $6\pi$ and so on.

One deduces from this the progress table illustrated in FIGURE 7.

In this table there are demarcated the horizontal cases separated by the limit angles of $\pi/3$ and $5\pi/3$, between 0 and $2\pi$. Three cases correspond to each subdivision; the one marked "PA" indicates the "go" phase used, the second marked "PR" indicates the "return" phase used, the third "Th" indicates the thyristors functioning in each case. Alongside each line, I gives the odd pulses, II indicates the even pulses.

It is seen from the table of FIGURE 7 that for any angle value the three phases figure in the combination of the cases I+II: accordingly, the three phases supply current for the duration of the period.

As has been mentioned above it is necessary for the voltage $V_c$ of the capacitor 308 to be less than the voltage between phases considered, in a given interval, to permit the release of corresponding thyristors. The comparison between the voltage $V_c$ of the capacitor and the voltages between phases can be made by rectifying for instance the voltages between phases. As is explained below, comparison members, certain of which compare between them the demi-sinusoidals of voltage such as A, B, C and other demi-sinusoidals such as (−A), (−B), (−C), after rectification, transmit an information designating the voltage out of the voltages A, B, C which is greater than two others and the voltage out of the voltages (−A), (−B), (−C) which is greater than two others; consequently at any given moment one has two signals which are compared alternately to the voltage $V_c$ of the capacitor. FIGURE 6c represents the demi-sinusoidal A, B, C and (−A), (−B), (−C), after rectification, the voltage $V_c$ of the capacitor being compared alternately to the voltage of the voltages A, B or C which is greater than the other two, then to the voltage of the rectified voltages (−A), (−B) or (−C) which is greater than the other two. Thus, in the interval $4\pi/3$ to $5\pi/3$ we shall have alternate comparison of $V_c$ with A and (−B) and in the interval $5\pi/3$ to $2\pi$ alternate comparison of $V_c$ with (−B) and C.

Figure 8A:
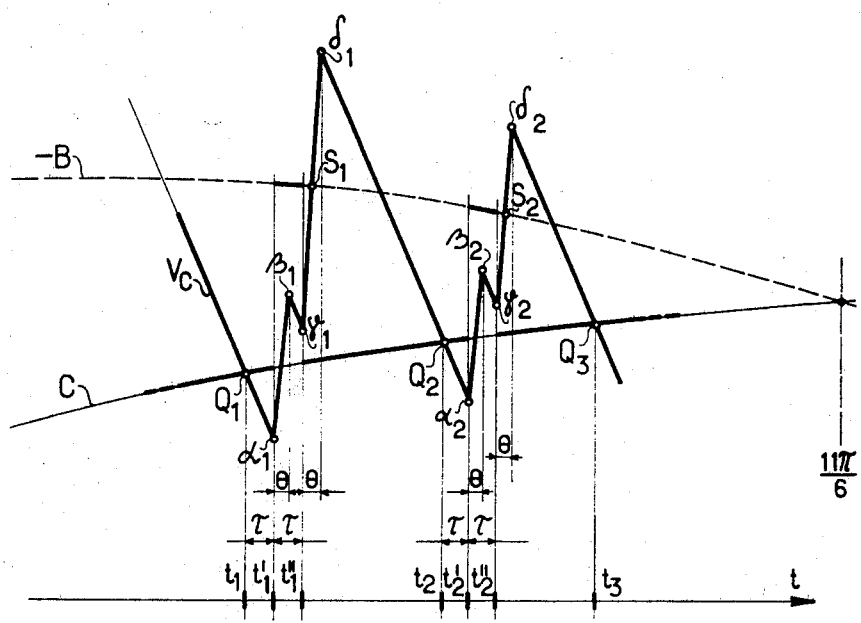
FIGURES 8a, 8b, 8c are graphs on a large scale explaining the sequence of operations in the triphased functioning.
Figure 8B:
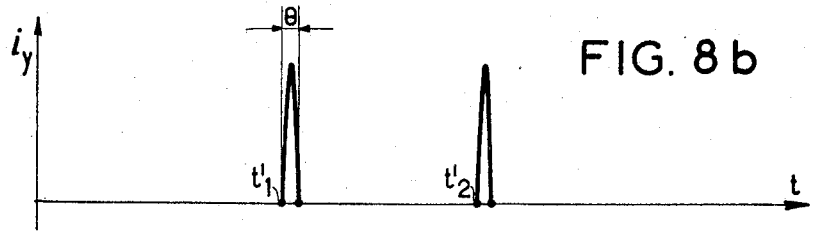

FIGURE 8a shows the train of events with enlarged time scale. It shows portions of the graph lines (−B) and C of FIGURE 6c, between the points $5\pi/3$ and $11\pi/6$ and the variations of the potential $V_C$. The reference for making the choice of the thyratrons to be started and the moment of starting is taken alternately from the graph C and graph (−B).

As the reference is the graph C, with the potential $V_C$ dropping below C at the time $t_1$, passing through the point $Q_1$, the delay time T for the starting begins to run at the time $t_1$, and one time T after at the time $t'_1$, the starting of the thyristors $T_5$ and $T_4$ takes place under the action of a signal to the gates, the phases Y and Z supply current (see FIGURE 7), the potential $V_C$ which has dropped from $Q_1$ at $\alpha_1$ rises to $\beta_1$ at the time $t'_1+\theta$, $\theta$ being the duration of the current pulse.

At the time $t'_1$ the reference passes to the curve −B. As the point $\beta_1$ is below −B, the voltage comparator immediately gives the order to engage the delay T. At the end of the delay T, at the period $t''_1$, the potential $V_C$ has dropped from $\beta_1$ to $\gamma_1$. At this moment the thyristors $T_5$ and $T_2$ are started under the effect of a signal to their gates (see FIGURE 7). The potential rises again from $\gamma_1$ to $\delta_1$, passing beyond $S_1$, which is the meeting point with the curve −B, at a level such that $S_1-\delta_1$ is equal to $\gamma_1-S_1$. It passes to $\delta_1$ at the time $t''_1+\theta$.

At the time $t''_1$ the reference again changes to C. From the point $\delta_1$ the potential drops down again, intersects the curve C at $Q_2$ at the time $t_2$, drops down to $\alpha_2$ at the time $t'_2$ at the end of a delay T, rises to $\beta_2$, returns to $\gamma_2$ at $t''_2$, rises again at $\delta_2$ at the time $t''_2+\theta$ and passes at $Q_3$ at the time $t_3$, and so on.

Figure 8C:
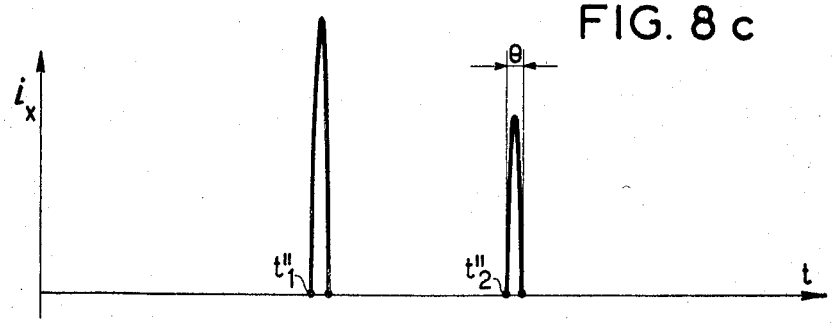

One can see on the axis of the time $t$ that the interval between $t_3$ and $t_2$ is less than the interval between $t_2$ and $t_1$. At the same time the current pulse which loads the capacitor from $\gamma_2$ to $\delta_2$ is less than that which loads it from $\gamma_1$ to $\delta_1$, as can be seen in the graph of FIGURE 8c.

On the other hand, the current pulses which load the capacitor from $\alpha_1$ to $\beta_1$ and from $\alpha_2$ to $\beta_2$ are equal, as can be seen from the graph 8b.

It results that one of the phases (Y) supplies pulses which are of one polarity equal, and closer together: from this results a mean supply which increases; whereas the second phase (X) supplies pulses of the other polarity, drawn more closely together, but of strongly diminished amplitude; (from which results a mean supply which decreases), the third phase (Z) supplying pulses of the two polarities, supplies a constant current.

In reference to the same phase one obtains a current supply $i$ such as that illustrated in FIGURE 9, and which is to be explained directly in accordance with the above discussion.

Between 0 and $\pi/6$, the phase considered supplies pulses of one polarity, and of amplitude that is approximately constant, closer and closer together.

Between $\pi/6$ and $2\pi/6-\pi/3$— the phase supplies pulses of the other parity, more and more widely spaced, of increasing amplitude. From this it results that between 0 and $\pi/3$ there is a mean supply which increases from 0 approximately linearly.

Between $\pi/3$ and $3\pi/6$, the phase supplies pulses of the two polarities, on the one hand closer and closer together and of approximately constant amplitude, and on the other hand, also closer and closer together, of diminishing amplitude. Between $3\pi/6$ and $2\pi/3$ the phase supplies pulses of the two polarities, on the one hand more and more widely spaced and of approximately constant amplitude, and on the other hand more and more widely spaced of increasing amplitude. As a result between $\pi/3$ and $2\pi/3$ there is a mean supply of the phase that is approximately constant, the variation of one of the components being compensated by an opposite variation of the other component.

Between $2\pi/3$ and $\pi$, the phase will supply a mean decreasing current by a process symmetrical with the phenomenon described above between 0 and $\pi/3$.

Between $\pi$ and $2\pi$, the phase will supply a mean current of symmetrical shape, of opposite polarity.

This, it should be understood, is true for any phase whatsoever.

One accordingly obtains for each phase a supply of generally trapezoidal shape in phase with the phase voltage $V_p$.

In FIGURE 8a, it is possible for the points $\gamma_1$, $\gamma_2$ to be placed below the graph C. If at this moment the reference is at C, disturbance can result therefrom, since the comparator will begin to engage the delay T and there no longer be reference alternation. It is accordingly advisable to delay the change of reference by a fixed delay, after the starting of the delay. This fixed delay can be approximately equal to the duration of one current pulse $\theta$.

Figure 10:
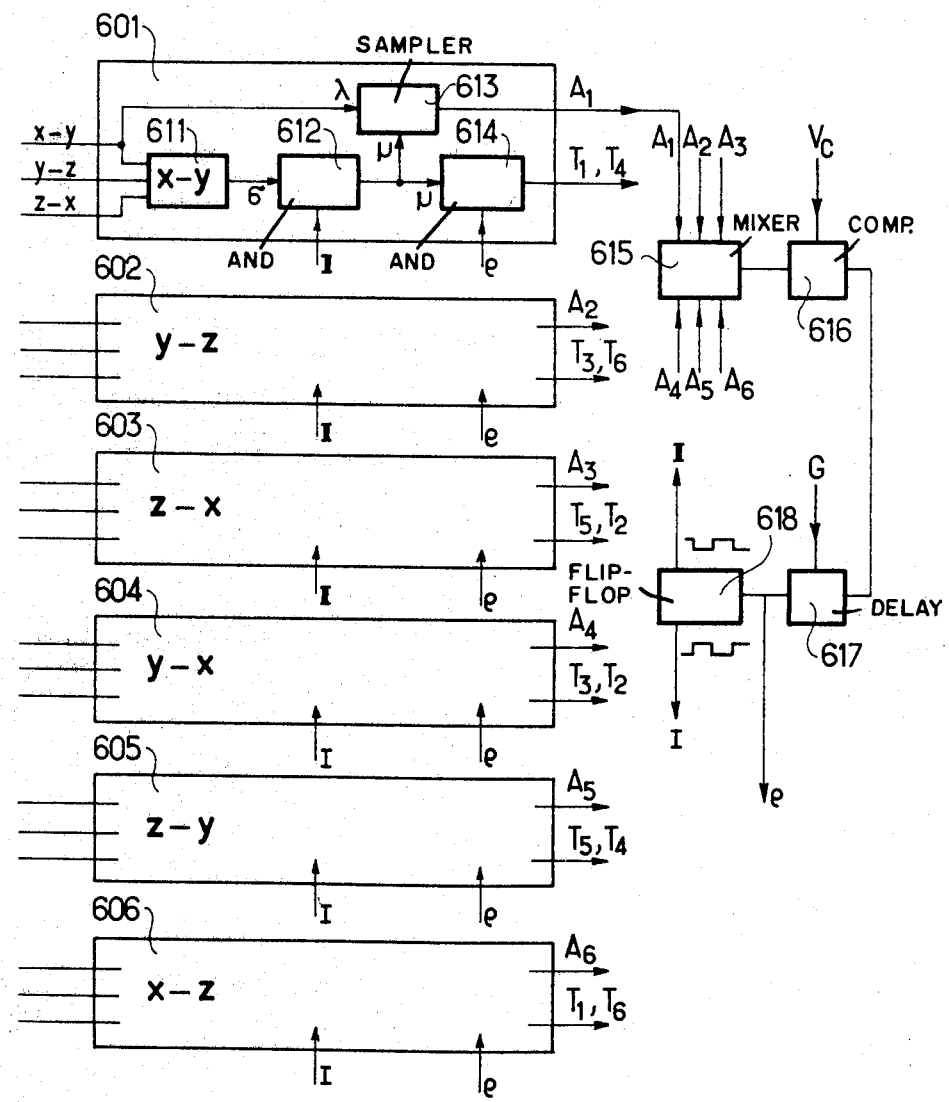
FIGURE 10 is a part diagram of a control member used in the case of a triphased network.

FIGURE 10 gives in diagrammatic form an example of an embodiment of the member 311 of FIGURE 4; 601, 602, 603, 604, 605, 606 are comparison assemblies between the phases and the other decision of the thyristors; accordingly 601 compares the alternations -A, -B, -C of FIGURE 6b, these three voltages passing into a comparison member 611 which allows one single information to pass when the voltage X–Y is greater than two other voltages Y–Z and Z–X, which corresponds to the intervals 0 to $2\pi/3$ and $2\pi$ to $8\pi/3$ and so on of FIGURE 6b.

The same is true for the comparison members of the assemblies 602, 603, 604, 605, 606 whose output signal towards the thyristors is possible only if one has a signal at the output of the comparator; in each assembly 601, 602, 603, 604, 605, 606 the voltage has been referenced which should be the greatest, for the corresponding comparator to transmit an information.

One has accordingly: X–Y for referencing the assembly 601

Y–Z for referencing the assembly 602
Z–X for referencing the assembly 603
Y–X for referencing the assembly 604
Z–Y for referencing the assembly 605
X–Z for referencing the assembly 606

Figure 11A:
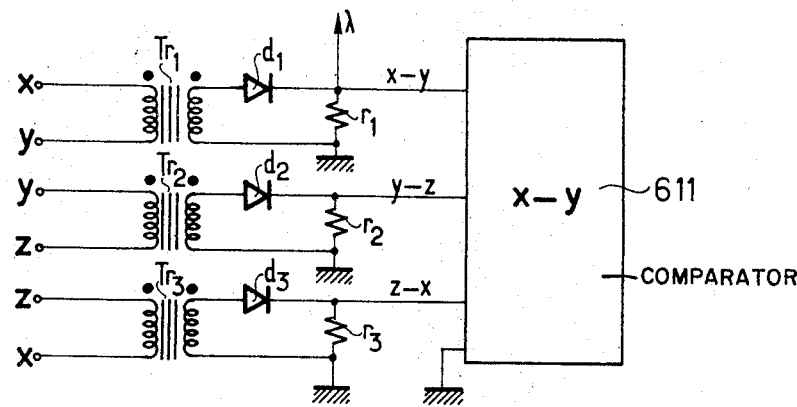
FIGURES 11a, 11b are details of FIGURE 10.
Figure 11B:
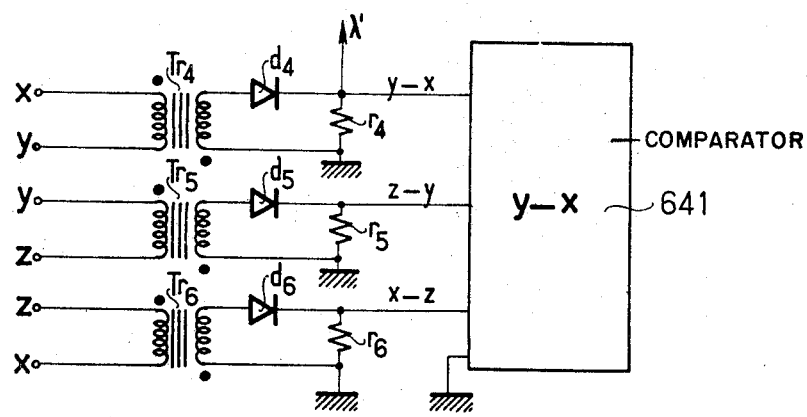

The various comparators such as 611 should compare three voltages between them; FIGURE 11a gives a possible diagram for the entry of three voltages to be compared; the primary windings of the transformers $Tr_1$, $Tr_2$, $Tr_3$ are connected respectively to the points $x$ and $y$, $y$ and $z$ and $z$ and $x$ of FIGURE 4, the secondary windings comprise a diode and a resistance in series $d_1$ and $r_1$, $d_2$ and $r_2$, $d_3$ and $r_3$; in this way one produces a mono-alternation rectification of the voltages between the points $x$, and $y$, $y$ and $z$, $z$ and $x$ in order to obtain respectively the voltages represented by X–Y, Y–Z, Z–X at the terminals of the resistors $r_1$, $r_2$, $r_3$. The element 604 characterised by Y–X will receive this voltage in accordance with the diagram of FIGURE 11b, for instance the secondary winding of the transformer Tr$_4$ will be connected to the diode $d_4$ and to the resistor $r_4$ in such a way that at the terminals of $r_4$ one will have the voltage Y–X indicating that the potential of the point $y$ is greater than that of point $x$.

The comparator 611 makes the comparison between three rectified voltages, dephased through 120° electric, and will only transmit an opening signal to the gate 612 when the voltage X–Y is greater than the others, i.e., during the intervals from 0 to $2\pi/3$, $2\pi$ to $8\pi/3$ and so on in accordance with FIGURE 6b; the same is true for the comparators of the assemblies 602, 603, 604, 605, 606.

The assembly 601 comprises, in addition to the comparators 611, a logical AND gate 612 which at one input can receive the signal $\delta$ and at another input a control signal II ("even") and supplies a control signal $\mu$, a sampling device 613 having one input of signal $\lambda$ and an input of order "conductive-nonconductive" $\mu$ connected to the output of the AND gate 612, a logical AND gate 614 which can receive at one input a signal $\mu$ issuing from the AND gate 613 and signal $\rho$ issuing from the member 617 below. The assemblies 602, 603, 604, 605, 606 are identical to the assembly 601 and accordingly have the same elements.

The signals $A_1$, $A_2$, $A_3$, $A_4$, $A_5$, $A_6$ issuing from the phase comparators 601, 602, 603, 604, 605, 606 respectively are passed to a passive mixer 615, followed by a pilot comparator 616, 617 a device which introduces a variable delay under the effect of a programme order G, 618 is a bistable flip-flop "even-odd" with two outputs II–I.

Let us suppose accordingly that we are in the interval 0 to $\pi/3$ of FIGURE 6b. The comparator 611 transmits a signal to the gate 612 since we have X–Y greater than Y–Z and Z–X; the gate 612 then receives "even" pulses from the rocker 619 and transmits a signal in the form of pulses to 613 which moreover receives the rectified voltage X–Y. The member 613 supplies a signal $A_1$ which is a sampling of X–Y to the mixer 615, which should also receive a signal $A_5$ issuing from 605, references with Z–Y as one can see from FIGURE 6b. The output of the mixer 615 is accordingly composed of signals $A_1$ and $A_5$ sampling of sinusoidal branches of X–Y and Z–Y, complementary sampling since 612 has received "even" pulses (II) from the flip flop 618, whereas it is the "odd" pulses which have sampled Z–Y. The pilot comparator 616 then compares the output voltage of 615 to the voltage $V_c$ of the capacitor 308 of FIGURE 4, and supplies a signal to 617 when the voltage $V_c$ is less than the voltage $A_1$ or $A_5$ at the output of 615; there is alternate comparison with $A_1$ and $A_5$, at the frequency of the pulses supplied by 619 and which have been used for the sampling of X–Y and Z–Y. The output signal of 616 is supplied to the delay member 617 which at G receives information issuing from a programme and introduces a variable delay in the transmission of the signal issuing from 616, said delay being dependent on the programme G. The output signal of 617$\rho$ is supplied to the bistable rocker 618. The output signal $\rho$ is supplied on the other hand to the AND gate 614 of the assembly 601 as well as to the AND gates analogous to 614, in the assemblies 602, 603, 604, 605, 606. The rocker 618 supplies "even" and "odd" signals (II, I), the signals "II" being applied to the AND gate 612 of the assembly 601, and to the AND gates analogous to 601 in the assembly 602 and 603; the signals "I" are supplied to the AND gates analogous to 601 in the assembly 604, 605, 606. The output signal of the AND gate 614 of the assembly 601, $D_1$, is directed towards the thyristors $T_1$ and $T_4$ of FIGURE 4; the signals emitted by the AND gates analogous to 614 of the assembly 602, 603, 604, 605, 606 are directed towards the corresponding thyristors of FIGURE 4, i.e.:

T3 and T6 for the assembly 602
T5 and T2 for the assembly 603
T3 and T2 for the assembly 604
T5 and T4 for the assembly 605
T1 and T6 for the assembly 606

In the example selected of the functooning between 0 and $\pi/3$ the assemblies 601 and 605 receive respectively an "even" (II) signal and an "odd" signal (I) from the flip-flop 618; these assemblies control respectively the thyristors $T_1$ and $T_4$, $T_5$ and $T_4$, which means that an "even" signal from the rocker 618 will sharpen the pulse $p$ to the thyristors $T_1$ and $T_4$ and that the "odd" signal immediately following an "even" signal will sharpen the pulse $p$ to the thyristors $T_5$ and $T_4$. Accordingly in FIGURE 5 it can be seen that one will have successively and alternately conduction of the thyristors $T_1$ and $T_5$, the return always being carried out through $T_4$ which is opened simultaneously to $T_1$ and $T_5$. The same reasoning can be extended to the following intervals:

$\pi/3$ to $2\pi/3$, $2\pi/3$ to $\pi$, $\pi$ to $4\pi/3$ and so on

The functioning described for FIGURES 3 and 5 was a functioning with rectifier, where one had the voltage $V_c$ of the capacitor less than the voltage at the terminals of one or several thyristors; the functioning with non autonomous inverter develops easily therefrom, since we then have the load 310 for FIGURE 5 or 211 for FIGURE 3, which acts as a generator and under these conditions it is necessary to open the thyristor or thyristors whose voltage is less than the voltage $V_c$ of the capacitor.

In the above description of the functioning of FIGURES 1, 2 and 4 reference has been made to: the thyristor $T_1$, the thyristor $T_2$ and so on; it is of course within the framework of the invention to use assemblies constituted of $n$ thyristors in series for instance, or connected in parallel or in series parallel, assemblies known under the appellation of high tension columns, as is the case in problems of transporting energy by direct current, such columns functioning under very high voltages.

The inductors 206 of FIGURE 3, 305, 306, 307 of FIGURE 5 can be replaced as a whole or in part by transformer leak inductors. The invention also applies to the case of a transformer whose secondary windings would be assembled in delta form. In this case the inductors 305, 306, 307 are connected to the apices of the delta, the remaining part of the device being without change.

The description has been given with reference to a triphased sector; the method in accordance with the invention is applicable to any number of phases. To diminish the intensity of the transistory currents in the transformer, one inserts between each end of a phase winding and the associated thyristor a filtering cell comprising an inductor in series and a capacitor in derivation. Such inductor can be constituted by a leak inductor.

I claim:

1. A device for the conversion of electrical energy from alternating to direct or vice versa with cosine approximating unity comprising
    an alternating current source,
    a voltage controlled rectifier means of the thyristor-type,
    program control means connected to said rectifier for controlling the operation thereof, and
    circuit means connected in series with said rectifier across said alternating current source for generating current pulses at a very much higher frequency than the frequency of the alternating current of said source with a delay between successive pulses being selectively controlled by said program control means as a function of an order value of the current,
    wherein said program control means includes variable delay means for starting said rectifier at the end of a predetermined delay time after appearance across said rectifier of a voltage in the conductive sense.

2. The combination as defined in claim 1 wherein the alternating current supplied by said source is in phase with the voltage.

3. The combination as defined in claim 1 wherein the alternating current supplied by said source is in phase opposition with the voltage.

4. A device for the conversion of electrical energy from alternating to direct or vice versa with cosine approximating unity comprising
an alternating current source,
a voltage controlled rectifier means of the thyristor-type,
program control means connected to said rectifier for controlling the operation thereof, and
circuit means connected in series with said rectifier across said alternating current source for generating current pulses at a very much higher frequency than the frequency of the alternating current of said source with a delay between successive pulses being selectively controlled by said program control means as a function of an order value of the current,
wherein said alternating current source is provided as a mono-phased source connected to the primary winding of a transformer, said rectifier being connected to one end of the secondary winding with said circuit means being connected to the center of said secondary winding across said rectifier, and further including an additional rectifier of the thyristor-type connected to the other end of the secondary winding, said program control means being connected to both rectifiers for controlling the operation thereof.

5. The combination defined in claim 4 wherein said circuit means comprises an inductor of relatively low value and a capacitor connected in series, and further including a load circuit connected in parallel with said capacitor including a D.C. load in series with an inductor of relatively high value.

6. The combination defined in claim 4 wherein said program control means includes variable delay means for starting said rectifiers during alternate cycles of the supply voltage, respectively, at the end of a predetermined delay time after appearance across said rectifiers of a voltage in the conductive sense.

7. A device for the conversion of electrical energy from alternating to direct or vice versa with cosine approximating unity comprising
an alternating current source,
a voltage controlled rectifier means of the thyristor-type,
program control means connected to said rectifier for controlling the operation thereof, and
circuit means connected in series with said rectifier across said alternating current source for generating current pulses at a very much higher frequency than the frequency of the alternating current of said source with a delay between successive pulses being selectively controlled by said program control means as a function of an order value of the current,
wherein said alternating current source includes a supply transformer having a secondary composed of three windings connected in star arrangement, said circuit means including three inductors in series with the three windings of said transformer secondary, respectively, and a capacitor, five additional voltage controlled rectifiers of the thyristor type, three rectifiers connecting one end of said capacitor to each of said three inductors, respectively, and three rectifiers connecting each of said three inductors to the other end of said capacitor, respectively, said program control means being connected to each of said rectifiers for controlling the operation thereof.

8. The combination defined in claim 7 wherein said program control means includes selection means for selecting the difference in potential between the ends of two phase windings which is the greatest of three differences of potential between three phase windings taken in pairs, a pilot comparator device operatively associated with said selection means with the voltage at the terminals of said capacitor, variable delay means associated with said pilot comparator for controlling the starting of said thyristors through application of a control signal, and bistable means responsive to said selection means and said delay means for providing said signal.

9. The combination defined in claim 7 wherein a load circuit is connected in parallel with said capacitor consisting of a high value inductor and a D.C. load device in series circuit.

10. A device for the conversion of electrical energy from alternating to direct or vice versa with cosine approximating unity comprising
an alternating current source,
a voltage controlled rectifier means of the thyristor-type,
program control means connected to said rectifier for controlling the operation thereof, and
circuit means connected in series with said rectifier across said alternating current source for generating current pulses at a very much higher frequency than the frequency of the alternating current of said source with a delay between successive pulses being selectively controlled by said program control means as a function of an order value of the current,
wherein said alternating current source is a polyphase source including a supply transformer having $n$ phase windings, said circuit means including a plurality of low value inductors connected to the secondary of said supply transformer, a capacitor, said rectifier means including first thyristors connected between each inductor and one end of said capacitor, second thyristors connecting each of said inductors to the other end of said capacitor, a load circuit comprising a high value inductor in series with a D.C. load connected across said capacitor, said program control means including a regulatable delay member for starting said thyristors, two inputs connected to the terminals of said capacitor, $n$ inputs connected to said low value inductors, one control input, and $2n$ outputs connected respectively to said thyristors, said delay member having means for making a comparison between the voltage at the terminals of the capacitor and a voltage between phases loaded alternately.

11. A device for the conversion of electrical energy from alternating to direct or vice versa with cosine approximating unity comprising
an alternating current source,
a voltage controlled rectifier means of the thyristor-type,
program control means connected to said rectifier for controlling the operation thereof, and
circuit means connected in series with said rectifier across said alternating current source for generating current pulses at a very much higher frequency than the frequency of the alternating current of said source with a delay between successive pulses being selectively controlled by said program control means as a function of an order value of the current,
wherein said circuit means comprises an inductor of relatively low value and a capacitor, and further including a load circuit connected in parallel with said capacitor including a D.C. load in series with an inductor of relatively high value,
wherein a filtering cell is connected in series with said low value inductor.

12. A device for the conversion of electrical energy from alternating to direct or vice versa with cosine approximating unity comprising
   an alternating current source,
   a voltage controlled rectifier means of the thyristor-type,
   program control means connected to said rectifier for controlling the operation thereof, and
   circuit means connected in series with said rectifier across said alternating current source for generating current pulses at a very much higher frequency than the frequency of the alternating current of said source with a delay between successive pulses being selectively controlled by said program control means as a function of an order value of the current,
   wherein said circuit means comprises an inductor of relatively low value and a capacitor, and further including a load circuit connected in parallel with said capacitor including a D.C. load in series with an inductor of relatively high value,
   wherein said low value inductor is constituted at least partially by transformer leak inductance of a transformer forming part of said alternating current source.

References Cited

UNITED STATES PATENTS

| | | | |
|---|---|---|---|
| 2,869,004 | 1/1959 | Melville | 307—108 |
| 3,323,076 | 5/1967 | Pelly | 321—7 X |
| 3,332,002 | 7/1967 | Jollois | 321—61 |
| 3,405,345 | 10/1968 | Someda et al. | 321—18 |
| 3,412,315 | 11/1968 | Hehenkamp | 321—18 |

J. D. TRAMMELL, Primary Examiner

W. H. BEHA, JR., Assistant Examiner

U.S. Cl. X.R.

307—108; 321—9, 16, 61; 328—29